United States Patent [19]
Gandrud

[11] 3,714,913
[45] Feb. 6, 1973

[54] CHEMICAL APPLICATOR ASSEMBLY FOR A ROW CROP PLANTER

[76] Inventor: Ebenhard S. Gandrud, P.O. Box 528, Owatonna, Minn.

[22] Filed: Dec. 7, 1970

[21] Appl. No.: 95,501

[52] U.S. Cl. .................. 111/73, 111/80, 172/112, 172/547
[51] Int. Cl. ............................................. A01c 7/18
[58] Field of Search ............... 111/85, 10, 11, 73, 80; 172/112, 518, 547

[56] References Cited

UNITED STATES PATENTS

| | | | |
|---|---|---|---|
| 3,220,368 | 11/1965 | Gandrud | 111/73 X |
| 3,029,879 | 4/1962 | Wells, Jr. | 172/112 X |
| 3,596,616 | 8/1971 | Bauman et al. | 111/80 |
| 2,730,054 | 1/1956 | McDonald | 111/73 X |
| 3,220,369 | 11/1965 | Gandrud | 111/10 |

FOREIGN PATENTS OR APPLICATIONS

| | | | |
|---|---|---|---|
| 1,094,681 | 12/1967 | Great Britain | 172/112 |

Primary Examiner—Robert E. Pulfrey
Assistant Examiner—Stephen C. Pellegrino
Attorney—Merchant & Gould

[57] ABSTRACT

Apparatus having means for attachment to a mobile agricultural implement and arranged to apply chemicals to the earth. The apparatus includes a rotary incorporating wheel engaging the ground adjacent chemical applicators and operating to incorporate the chemicals with the earth material above planted seed for the purpose of preventing growth of weeds and injurious insects.

5 Claims, 7 Drawing Figures

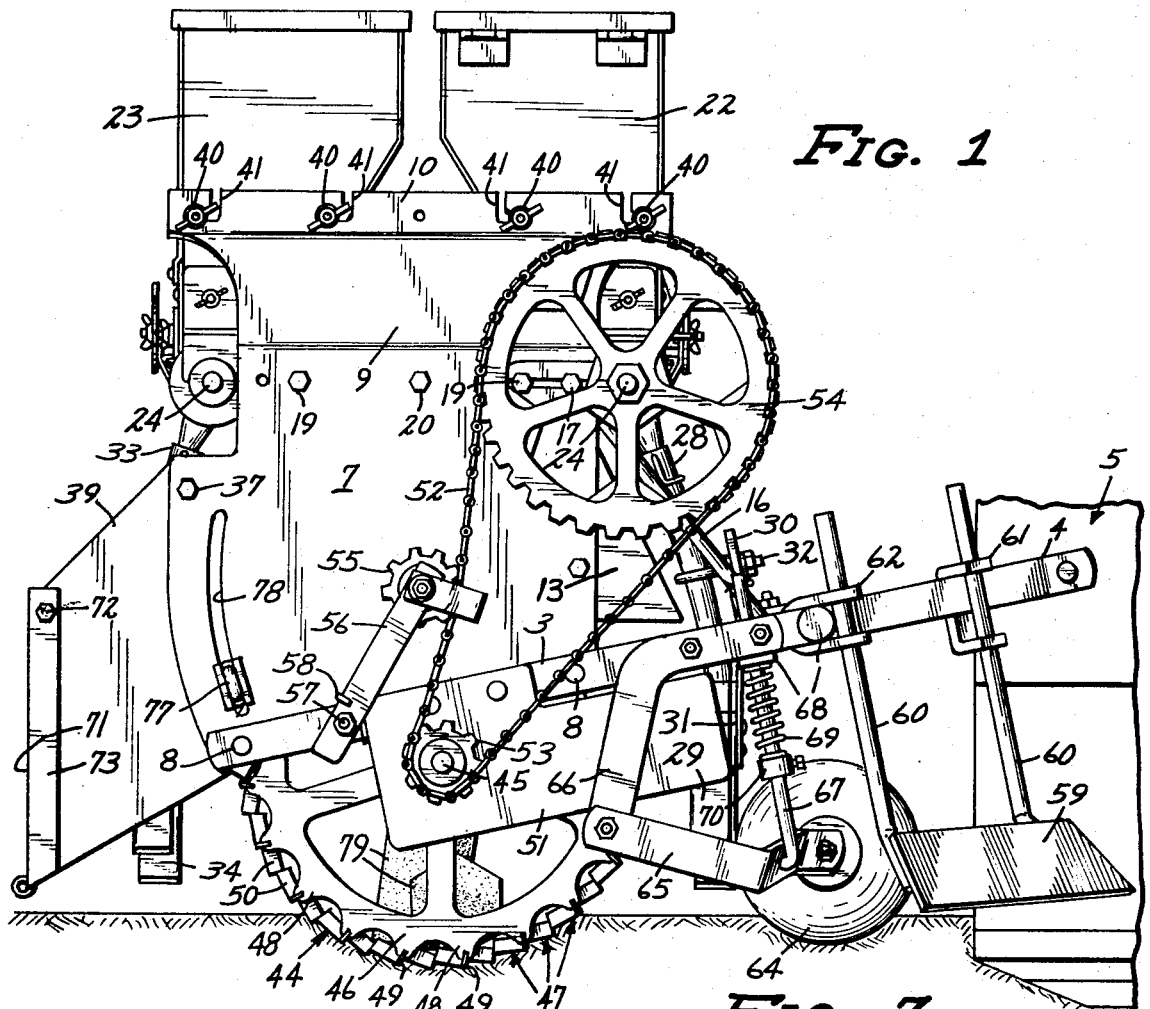
FIG. 1
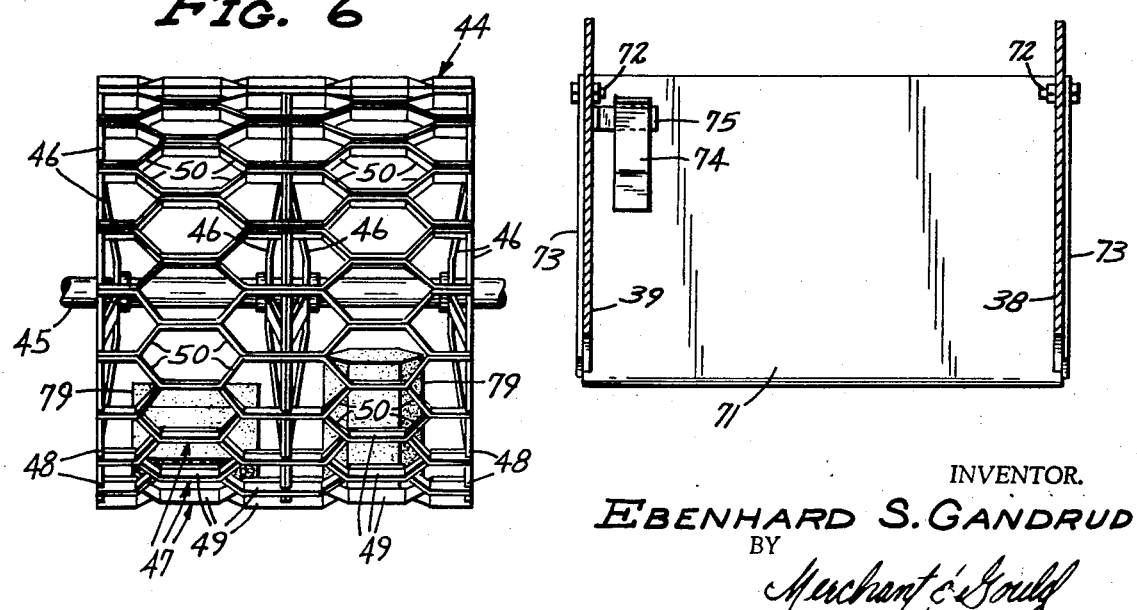
FIG. 6
FIG. 7
INVENTOR.
EBENHARD S. GANDRUD
BY
Merchant & Gould
ATTORNEYS

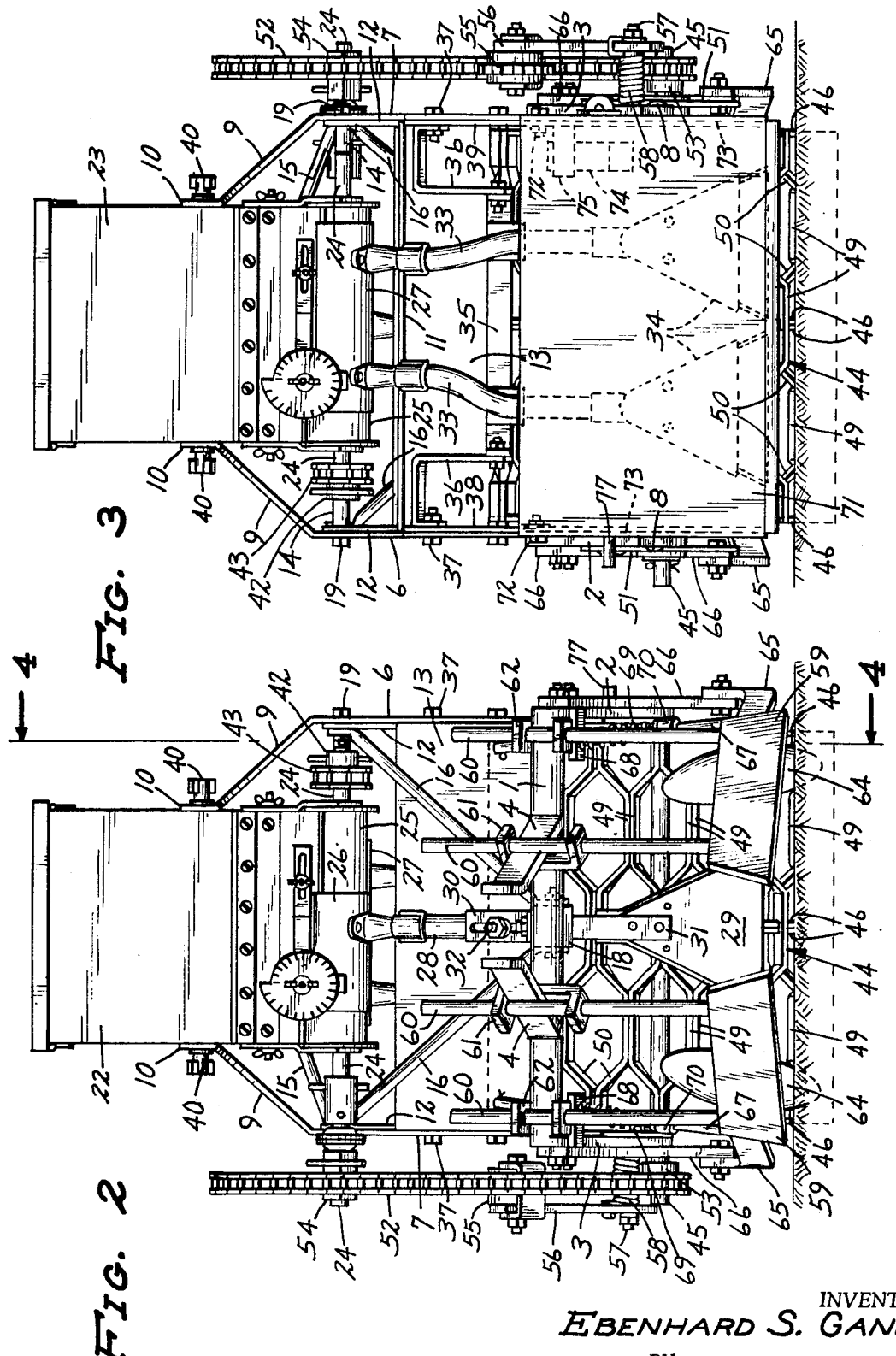

INVENTOR.
Ebenhard S. Gandrud
BY
Merchant & Gould
ATTORNEYS

CHEMICAL APPLICATOR ASSEMBLY FOR A ROW CROP PLANTER

This invention involves a frame structure having means for trailing connection to a mobile agricultural implement, such as a seed planter, the frame structure journaling a row wheel having an axially elongated generally cylindrical rim. The rim includes a plurality of ground-engaging blade elements which firm or compact a layer of the earth over a row of planted seed, and which form a layer of loose top soil over the compacted layer. A pair of front and rear chemical dispensing hoppers overlie the row wheel and each have guide means to dispense granular chemical material to the ground, one in front of the row wheel and the other closely behind the row wheel. Preferably, one hopper dispenses insecticide and the other dispenses herbicide, the row wheel incorporating both chemicals into the layer of loose top soil as the assembly moves over the ground. The frame structure further includes laterally spaced side walls, a generally horizontal partition above the row wheel and above which the dispensing hoppers are mounted, a hood element at the front ends of the side walls and partition, and a normally generally vertical shield at the rear end of the side walls. The dispensing hoppers are equipped with feeding rotors for metering the material to be dispensed, and drive connections between the row wheel and the feeding rotors are operative to impart rotation to the rotors responsive to movement of the assembly over the ground.

DESCRIPTION OF THE DRAWINGS

FIG. 1 is a view in side elevation of the chemical applicator assembly of this invention, shown as being connected to a planting implement, the implement being shown fragmentarily, and the ground being shown in section;

FIG. 2 is a view in front elevation of the applicator assembly;

FIG. 3 is a view in rear elevation;

FIG. 6 is a fragmentary view in side elevation of the row wheel of the assembly; and FIG. 7 is a vertical section taken on the line 7—7 of FIG. 4.

DETAILED DESCRIPTION

Figure 4:
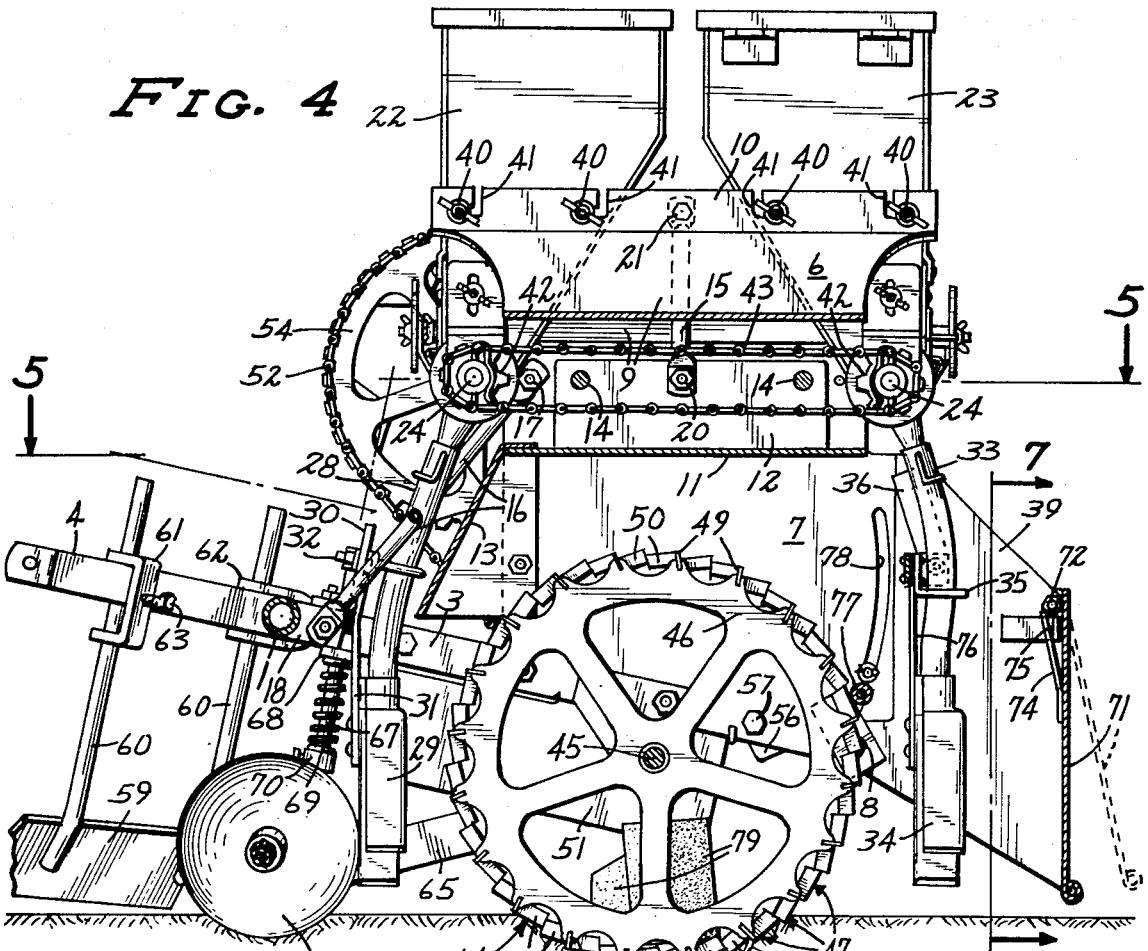
FIG. 4 is a view partly in side elevation and partly in section, taken on the line 4—4 of FIG. 2.
Figure 5:
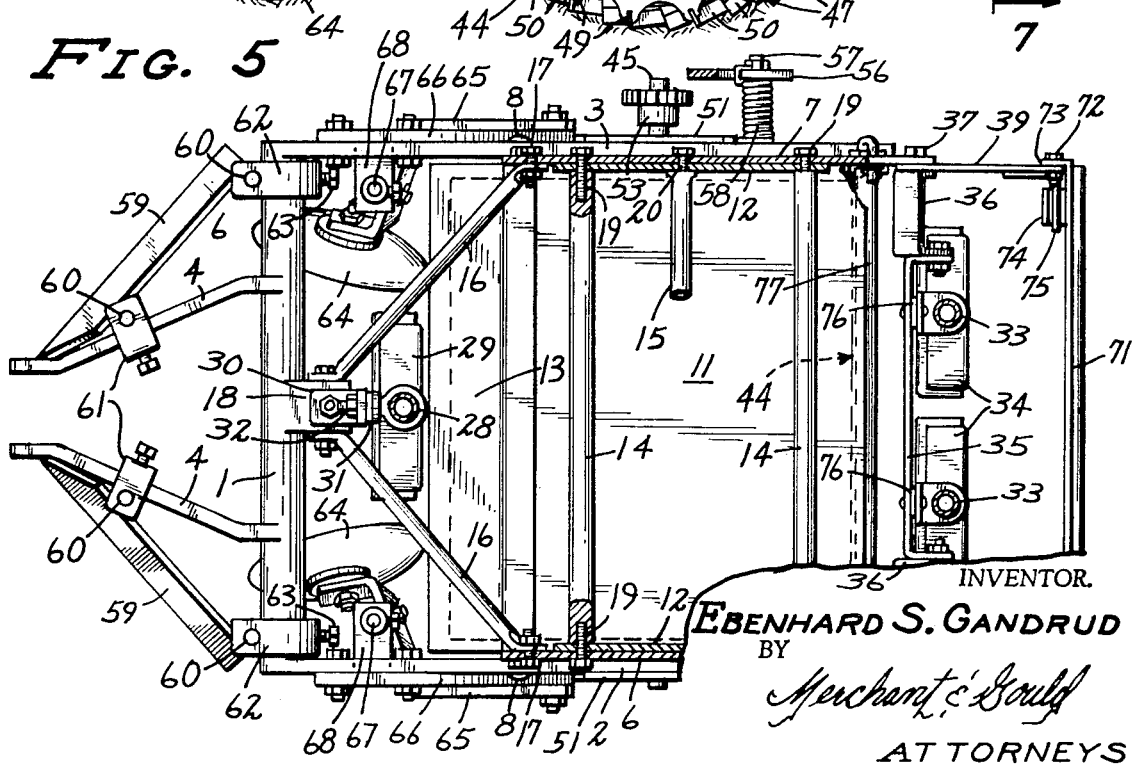
FIG. 5 is a view partly in plan and partly in horizontal section, taken on the irregular line 5—5 of FIG. 4.

A rigid frame structure is shown as comprising a horizontally disposed tubular transverse frame member 1, having a pair of laterally spaced parallel side frame bars 2 and 3 welded to the opposite ends of the frame member 1 and extending rearwardly therefrom, and a pair of laterally spaced forwardly projecting hitch bars 4, welded at their rear ends to the transverse frame member 1 and being adapted to be pinned, bolted or otherwise rigidly secured at their front ends to a mobile seed planting implement, a portion of the implement being shown fragmentarily in FIG. 1 and indicated generally at 5. The planting implement 5 may be any one of a number of well-known commercially available types, and in and of itself, does not comprise the instant invention. Hence, for the sake of brevity, further detailed showing and description thereof is omitted. The frame structure further includes a pair of laterally spaced vertical side wall elements 6 and 7 secured to the side frame bars 2 and 3 respectively by nut-equipped bolts or machine screws 8, the wall elements 6 and 7 extending upwardly from their respective side frame bars 2 and 3 and having upwardly converging portions 9 terminating in laterally spaced parallel upper edge flanges 10. The frame structure further includes a generally horizontal transverse partition 11 having mounting flanges 12, a transverse hood member 13 at the front edges of the side wall elements 6 and 7 and partition 11, a pair of tie rods or bars 14 extending transversely between the flanges 12, an oblique transverse tie rod 15 and a pair of brace members 16 having upper rear ends that are secured to the side wall elements 6 and 7 adjacent their front edges, by means of nut-equipped screws or the like 17, the brace members 16 converging angularly forwardly and downwardly, having their front ends bolted or otherwise rigidly secured to a mounting lug 18 on the transverse frame member 1. The tie rods or bars 14 are provided with machine screws 19 that extend through apertures in the side walls 6 and 7 and flanges 12, the screws 19 being screw threaded into opposite ends of the tie rods 14 to rigidly secure the partition 11 and tie rods 14 in place between the side wall elements 6 and 7. The tie rod 15 is bolted at one end to one of the flanges 12 and the adjacent side wall element 7, as indicated at 20, the tie rod 15 extending angularly upwardly and transversely of the apparatus and having its other end anchored to the upper edge flange 10 of the side wall element 6 by means of a bolt or like anchoring element 21.

Applicator means for applying chemical additives, such as herbicides and insecticides, to the ground, includes a pair of front and rear dispensing hoppers 22 and 23 respectively, each having a dispensing rotor therein, not shown, but each having an axial rotor shaft 24 extending outwardly from its opposite ends. The rotor shafts are disposed adjacent the arcuate bottom ends 25 of the hoppers 22 and 23, these bottom ends 25 being provided with metering plates or the like 26 and 27 on the hoppers 22 and 23 respectively. A guide tube 28 extends downwardly from the metering plate 26 to a distributor head 29, the guide tube 28 and distributor head 29 being supported from the frame structure by a bracket 30 rigidly secured to the anchoring lug 18, and a supporting bar or strip 31 secured to the bracket 30 by means of a nut-equipped screw or the like 32. The hoppers 22 and 23, together with their respective feeding rotors and rotor shafts 24, arcuate bottom portions 25 and respective metering plates 26 and 27 are generally of the type disclosed in my earlier U.S. Pat. No. 2,852,166, the distributor head 29 being generally of the type shown and described in my earlier U.S. Pat. No. 2,990,186. A pair of guide tubes 33 extend downwardly from the metering plate 27 to a pair of distributor heads 34 substantially identical to the distributor head 29, the tubes 33 and distributor heads 24 being supported from the side wall elements 6 and 7 adjacent their rear edges, by supporting brackets 35 and 36, the brackets 36 being bolted to the side wall elements 6 and 7 by nut equipped screws 37 which screws also mount side wall extension portions 38 and 39 to respective ones of the side walls 6 and 7.

The hoppers 22 and 23 have thumb screws 40 screw threaded into their opposite ends, the hoppers 22 and 23 being receivable between the upper edge flanges 10 of the side walls 6 and 7, the thumb screws 40 being received in upwardly opening L-shaped notches 41 in the flanges 10, see particularly FIGS. 1 and 4. As therein shown, the notches 41 adjacent the hopper 22 are of left hand, the notches 41 adjacent the hopper 23 being right hand, the hoppers 22 and 23 being adjustably movable toward and away from each other between the upper edge flanges 10. The rotor shafts 24 are each provided with a sprocket wheel 42, and an endless link chain 43 is entrained over the sprocket wheels 42, whereby one of the rotor shafts 24 is driven from the other thereof. Adjustment of the hoppers 22 and 23 toward and away from each other permits the chain 43 to be placed under proper driving tension, the hoppers 22 and 23 being releasably locked in their desired set positions by the thumb screws 40.

A row wheel, indicated generally at 44, is generally of the type shown in my U.S. Pat. No. 3,220,369, and includes an axial shaft 45, a plurality of axially spaced spoked discs or wheels 46 rigidly mounted on the shaft 45, and a generally cylindrical rim comprising a plurality of generally axially extending bars 47 rigidly secured to the outer marginal portions 48 of the wheels 46. The bars 47 are so shaped that alternate ones thereof have axially extending digging and incorporating blade sections 49 connected in face-to-face engagement by spot welding, and angularly disposed bridging sections or portions 50 that connect alternating ones of the portions 49, the bridging sections or portions 50 operating to compress or compact the soil engaged thereby during rotation of the wheel 44 over the ground. The frame structure includes a pair of plate-like members 51 each secured to and depending from a different one of the side frame bars 2 and 3, the members 51 having suitable bearings thereon journalling the shaft 45 and disposing the row wheel 44 between the side wall elements 6 and 7, below the partition 11, and between the front and rear distributor heads 29 and 34. Thus, the row wheel 44 is disposed to support the frame structure and parts carried thereby during movement of the planter 5 and chemical applicator assembly over a field.

Rotation imparted to the row wheel 44 by its engagement with the ground and during forward movement of the planter 5, is transferred to the rotor shafts 24 of the hoppers 22 and 23 by an endless link chain 52 that is entrained over a sprocket wheel 53 mounted fast on the row wheel shaft 45, and a second sprocket wheel 54 mounted fast on the rotor shaft 24 of the hopper 22, see particularly FIG. 1. The link chain 52 is kept under proper operating tension by engagement with an idler sprocket wheel 55 that is journalled on one end of a mounting arm 56 that is pivotally connected adjacent its opposite end to the side frame bar 3, as indicated at 57. A torsion spring 58 yieldingly urges the arm 56 in a direction of its swinging movement to press the sprocket wheel 55 into meshing engagement with the chain 52.

A pair of laterally spaced rearwardly diverging trash plows 59 are each provided with a pair of upstanding support legs or pins 60 having mounting yokes 61 and 62 longitudinally slidably mounted thereon. The mounting yokes 61 straddle the hitch bars 4 and the yokes 62 straddle the transverse frame member 1, each of the yokes 61 and 62 being provided with clamping screws 63 that are adapted to engage their respective hitch bars 4 and transverse frame member 1 to releaseably lock their respective trash plows 59 at a predetermined elevation relative to the ground surface. With reference to FIG. 1, it will be seen that the trash plows 59 are disposed adjacent the planter 5 so as to clear away stones or trash from the ground surface ahead of the pesticide distributor heads 29 and 34, and the row wheel 44. A pair of covering disks 64 are journaled at the front ends of a pair of mounting arms 65 having their rear ends pivotally mounted to the lower ends of brackets 66 each rigidly secured to a different one of the side frame members 2 and 3. The covering disks are each disposed between a different one of the trash plows 59 and the front distributor head 29, and operate to cover the planted seed as the assembly moves over a field. Each mounting arm 65 is provided with an upwardly extending stem 67 that projects slidably through a guide lug 68 on an adjacent one of the side frame bars 2 and 3. A coil compression spring 69 on each stem 67 is interposed between its respective lug 68 and a collar 70 on its respective stem, to yieldingly urge its respective disk 44 downwardly into covering engagement with the ground.

During the planting operation, the hoppers 22 and 23, the rotor shafts 24 of which are rotated by rotary motion of the row wheel 44, dispense measured amounts of chemical granules through their respective guide tubes 28 and 33 and distributor heads 29 and 34 to the ground respectively before and behind the row wheel 44. The blade portions 49 and bridging portions 50 of the row wheel bars 47 compact the earth over the planted seed, while pushing granular material dispensed through the distributor head 29 into the ground. As the row wheel 44 rotates over the ground, the blade portions 50 throw the topmost portion of the earth or soil angularly rearwardly and upwardly through the stream of chemical granules dropping from the distributor heads 34, to provide a layer of topsoil over the compacted earth, the chemical granules from both front and rear distributor heads 29 and 34 becoming incorporated with the layer of topsoil.

A flat, normally vertically disposed rear shield 71 is pivotally secured adjacent its upper edge, by means of pivot bolts or the like 72, to the rear edge portions of the side wall extensions 39. As shown, the pivot bolts 72 extend through forwardly projecting end flanges 73 at opposite ends of the shield 71, the flanges 73 being disposed laterally outwardly of their adjacent side wall extensions 38 and 39. As shown by full and dotted lines in FIG. 4, the shield 71 is capable of swinging movements between a full line position wherein the shield 71 engages the rear edges of the extensions 38 and 39, and a rearwardly angularly disposed position away from engagement with said rear edges. A leaf spring 74, rigidly secured at one end to the shield 71, engages a bracket or finger 75 secured to the extension 38 to yieldingly urge the shield 71 toward engagement with the rear edges of the side wall extensions 38 and 39. The shield 71 cooperates with the side walls 6 and 7, their extensions 38 and 39, the partition 11, hood 13 and plate-like members 51 to keep the soil and dispensed chemical material confined, particularly during windy weather and when the topsoil is dry.

With reference to FIG. 4, it will be noted that the distributor heads 34 are suspended from the bracket 35 by means of hanger strips 76 which, like the strip 31 associated with the distributor head 29, are resilient in a direction longitudinally of the direction of travel of the apparatus. The resiliency of the strips 31 and 76, together with the resilient pivotal mounting of the rear shield 71, permits the apparatus to be moved over hard clods, stones or other foreign matter without injury to the distributor heads 29 and 34 and the rear shield 71. For the purpose of preventing the openings defined by the bars 47 in the rim portion of the row wheel 44 from becoming choked with clods or lumps of earth when the ground is wet or damp, a bar 77 is mounted adjacent its opposite ends in a pair of generally vertically extending arcuate slots 78 in the rear end portion of the side walls 6 and 7, for floating movements toward and away from the outer peripheral surface of the row wheel 44. Normally, the bar 77 is disposed at the bottom of the slots 78 in closely spaced relationship to the wheel 44 to permit free rotation thereof. Should a stone or clod of earth become caught in one of the openings in the rim of the wheel 44 and carried upwardly, the same will strike the bar 77 and be dislodged thereby from the wheel 44. As a further aid in preventing a build-up of clods of earth or particles of foreign matter within the wheel 44, a pair of relatively heavy tumbling members 79 are provided. These tumbling members are preferably made of relatively soft material, such as rubber, and tumble about within the wheel 44 without damage thereto. However, the members 79 are of sufficient weight to break up clods and reduce the same to a point where they will move outwardly through the openings defined by the bars 47 or the openings defined by the spokes in the wheels 46. Thus, under all conditions of earth treatment, the row wheel 44 is maintained in proper working order.

The above-described apparatus has been found to be highly effective in providing a row of earth that is effectively compacted over the planted seed, and in which is incorporated an effective charge of pesticides. Further, the apparatus provides a layer of loose topsoil over the compacted area, the layer of topsoil having a relatively flat smooth top surface which readily soaks up rain so that the same is more effectively contained and does not run off as often happens when the usual press wheels are used in connection with planters.

What is claimed is:

1. A chemical applicator assembly comprising:
   a. frame structure including:
      1. laterally spaced generally vertical side walls having top and bottom edges and front and rear ends, and each defining a plurality of openings adjacent the top edges thereof,
      2. a generally horizontal partition element connecting the side walls intermediate said top and bottom edges,
      3. a hood element projecting angularly forwardly and downwardly from said partition element adjacent said front ends,
      4. and means for attachment to a mobile planting implement for common traveling movement therewith over the ground;
   b. applicator means for applying chemical additives to the ground including:
      1. a pair of front and rear dispensing hoppers,
      2. hopper mounting screws extending through said openings and having threaded engagement with said hoppers for securing said hoppers between the side walls above said partition element, the openings associated with at least one of said hoppers being elongated in a direction whereby said one of the hoppers may be moved toward and away from the other hopper,
      3. feeding rotors journaled in said hoppers, and
      4. front and rear guide means for directing material from said front and rear hoppers to the ground;
   c. a wheel journaled in the frame structure below said partition element on a generally horizontal axis extending transversely of the direction of travel of the frame structure, said wheel having ground engaging blade elements for imparting rotation to the wheel and incorporation of said material into the ground responsive to traveling movement of the frame structure;
   d. and power transmission mechanism for imparting feeding rotation to said rotors responsive to rotary movement of said wheel and comprising drive connections between said wheel and one of said rotors laterally outwardly of one of said side walls, and other drive connections between said feeding rotors above said partition element.

2. The chemical applicator assembly defined in claim 1 in which said hopper mounting means comprises a plurality of L-shaped notch-like openings in the side walls in the top edges thereof, and mounting elements extending through said openings and engaging said hoppers.

3. The chemical applicator assembly defined in claim 1 in which said side walls have portions extending rearwardly beyond said rear guide means, characterized by a normally generally vertically disposed rear shield, and means mounting said shield on the rear ends of said portions.

4. The chemical applicator assembly defined in claim 3 in which said last mentioned means comprises a pivot element mounting said shield at its upper end for swinging movements on a generally horizontal axis generally normal to said side walls and toward and away from the rear ends of said side wall portions, characterized by spring means yieldingly urging said shield in a forward direction of its swinging movement toward engagement with said rear ends of the side wall portions.

5. A chemical applicator assembly comprising:
   a. frame structure including means for attachment thereof to a mobile planting implement for common traveling movement therewith over the ground;
   b. applicator means for applying chemical additives to the ground including:
      1. a pair of front and rear dispensing hoppers,
      2. hopper mounting means mounting said front and rear hoppers in said frame structure,
      3. rotary feeding means journaled in in said hoppers,
      4. and front and rear guide means for directing material from the front and rear hoppers respectively to the ground;
   c. a wheel journaled in said frame structure below said hoppers and including axially spaced disk-like members and a generally cylindrical ground-engaging rim structure having soil compacting and incorporating blades defining openings to the interior of the wheel and imparting rotation to the wheel responsive to traveling movement of the frame structure;

d. power transmission mechanism comprising drive connections between said wheel and the rotary feeding means of one of said hoppers, and between the rotary feeding means of said front and rear hoppers;

e. and a tumbling member disposed in said wheel for tumbling movements therein whereby to crush lumps of earth entering the wheel through said openings.

* * * * *